United States Patent [19]

Sukhman

[11] 4,338,578
[45] Jul. 6, 1982

[54] MULTICOLOR PULSED COHERENT-LIGHT SOURCE

[76] Inventor: Yefim Sukhman, 31-48 41st St., Astoria, N.Y. 11103

[21] Appl. No.: 127,309

[22] Filed: Mar. 5, 1980

[51] Int. Cl.³ .............................................. H01S 3/08
[52] U.S. Cl. ...................................... 372/23; 372/26; 372/29; 372/97
[58] Field of Search .................... 331/94.5 M, 94.5 S, 331/94.5 N, 94.5 P, 94.5 C, 94.5 D; 313/425–428

[56] References Cited

U.S. PATENT DOCUMENTS 4,200,808  4/1980  Herbst .................................. 307/425

Primary Examiner—William L. Sikes
Assistant Examiner—Léon Scott, Jr.
Attorney, Agent, or Firm—Karl F. Ross

[57] ABSTRACT

A source of pulsed multicolor coherent light, usable for holographic purposes, comprises two lasers emitting wavelengths of 694 nm and 1064 nm, respectively. The emissions of these lasers are passed jointly through a nonlinear optical element such as an $LiIO_3$ or KDP crystal, acting as a mixer, and are then partly deviated through a similar element serving as a frequency doubler. The mixer emits a wavelength of 420 nm in the blue region of the spectrum; the wavelength of 694 nm lies in the red region, whereas the wavelength of 1064 nm is transformed by the frequency doubler to 532 nm in the green region.

7 Claims, 2 Drawing Figures

MULTICOLOR PULSED COHERENT-LIGHT SOURCE

FIELD OF THE INVENTION

My present invention relates to a source of pulsed multicolor coherent light to be used, for example, in producing color holograms.

BACKGROUND OF THE INVENTION

The use of lasers as emitters of monochromatic radiation in various regions of the visible spectrum is well known in the art. Up to now, however, only continuous-wave lasers have been utilized as light sources for producing full-color holograms since they alone have been able to provide the required single-frequency and single-transverse-mode ($TEM_{00q}$) regime in the red, green and blue regions of the visible spectrum. In the field of pulse-type holography, beams of red and green color are readily obtainable from Q-switched ruby and Nd:YAG lasers in combination with second-harmonic generators since these lasers are known to be operable in the $TEM_{00q}$ mode. However, there has not been available a comparable source of pulsed coherent radiation in the blue region of the spectrum, this lack being a serious impediment to the realization of full-color pulse holography. It has already been proposed (see U.S. Pat. No. 3,735,280) to use a multiple-transition laser for producing the three primary color components with the aid of three second-harmonic generators. Still, such a system cannot be utilized for holographic purposes on account of the impossibility to maintain correlation among coherent radiations of different wavelengths generated in a common laser cavity.

OBJECT OF THE INVENTION

The object of my present invention is to provide a pulsed three-color coherent-light source particularly suitable for full-color holography.

SUMMARY OF THE INVENTION

I realize this object, in accordance with this invention, by providing a first laser whose coherent radiation lies in the red region of the spectrum, a second laser whose coherent radiation lies in the infrared part of the spectrum and has a wavelength which is twice that of a color in the green region of the spectrum, and light-guiding means optically aligned with the two lasers for forming their emissions into collinear beams, the light-guiding means including a nonlinear light-transmitting element disposed in a common path of the collinear beams to sum the frequencies of the two coherent radiations for producing a third coherent radiation in the blue region of the spectrum. A frequency doubler, also forming part of the light-guiding means, lies in the path of the second (infrared) radiation for deriving therefrom a fourth coherent radiation in the green region of the spectrum. A supply of pulsed energy serves for the correlated pumping of the two lasers.

According to the specific embodiment described hereinafter, the active medium of each laser is a solid body irradiated by a lamp and located in a respective cavity in which that body is inserted between a totally reflecting mirror and a resonant reflector, the latter giving passage to a fraction of the coherent radiation stimulated by intermittent energization of these lamps. The cavities also contain normally opaque electro-optical shutters which are simultaneously rendered radiation-transmissive for a brief instant by a trigger pulse coinciding with maximum flow of energizing current in the two active media.

As active media I may use for the first laser a ruby, oscillating with a wavelength of 694 nm, and for the second laser a neodymium-doped mineralic substance (e.g. Nd:YAG) oscillating with a wavelength of 1064 nm. In that case the third radiation, representing the sum of the first two, will have a wavelength of 420 nm.

Pursuant to a more particular feature of my invention, part-transmissive reflectors included in the light-guiding means lie downstream of the nonlinear transmitting element for deviating a fraction of the oncoming radiation from the common beam path onto a branch path which subsequently rejoins the common path, the frequency doubler lying in that branch path. The same branch path may include focusing means, preferably in the form of one or more cylindrical lenses, in line with the frequency doubler.

BRIEF DESCRIPTION OF THE DRAWING

The above and other features of my invention will now be described in detail with reference to the accompanying drawing in which.

SPECIFIC DESCRIPTION

Figure 1:
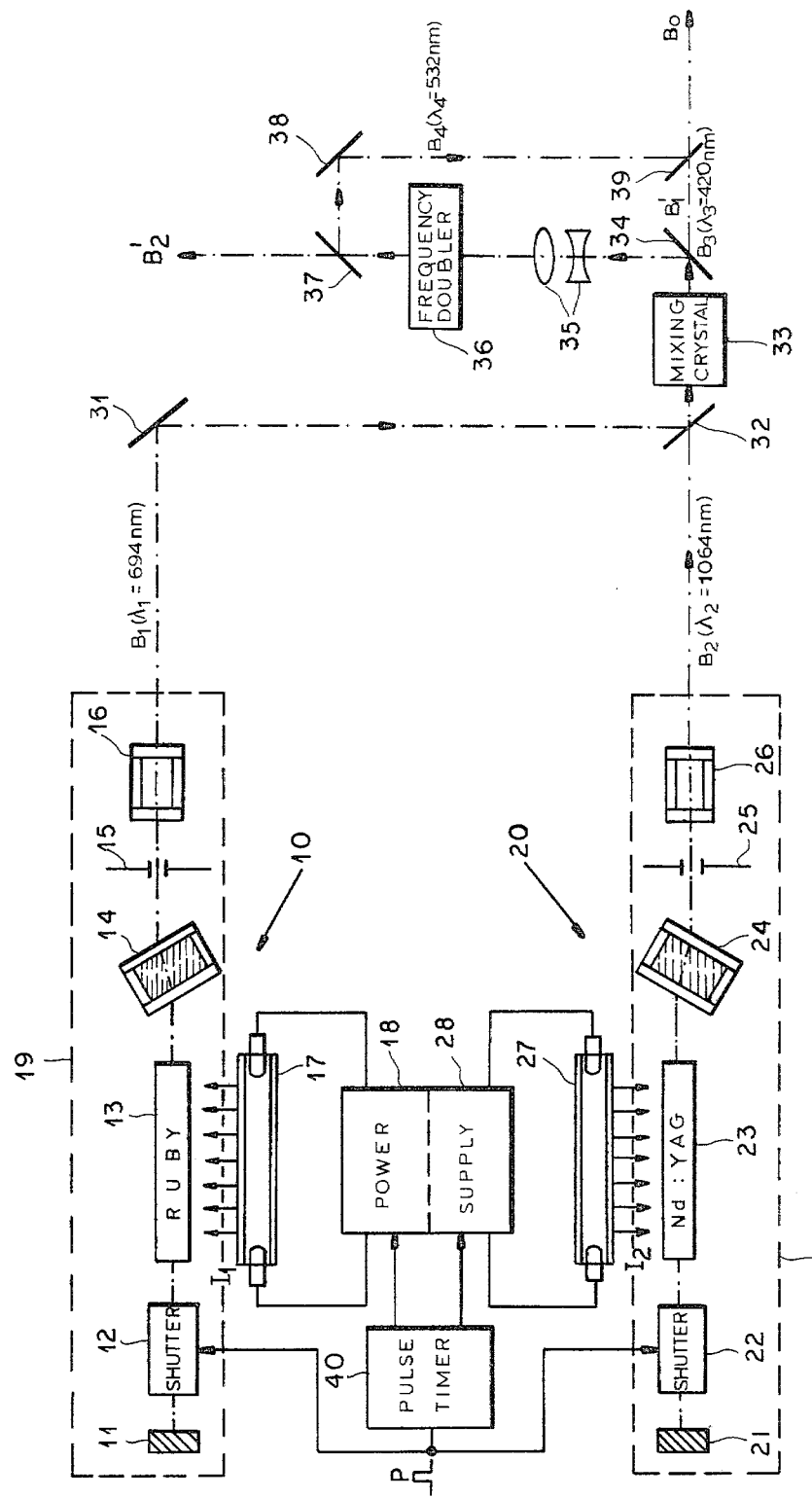
FIG. 1 is a partly pictorial and partly diagrammatic representation of a system constituting a preferred embodiment.

In FIG. 1 I have shown a ruby laser 10, emitting a beam $B_1$ of coherent radiation with a wavelength $\lambda_1$ of 694 nm, and an Nd:YAG laser 20, emitting a beam $B_2$ of coherent radiation with a wavelength $\lambda_2$ of 1064 nm. The active media 13, 23 of these lasers are a pair of elongate, solid bodies which are spacedly disposed between totally reflecting mirrors 11, 21 and resonant reflectors 15, 25 (of quartz or sapphire plates, for example, designed to narrow the bandwidth of the emitted radiation) located at opposite ends of their respective cavities 19 and 29. The cavities further contain dye cells 14, 24 and optical diaphragms 15, 25 which stabilize the $TEM_{00q}$ mode of radiation generation. Bodies 13, 23 are optically pumped by lamps 17 and 27 emitting periodic flashes of light. Lamps 17 and 27 are energized by respective sections 18 and 28 of a common power supply synchronized by a pulse timer 40 which also briefly makes a pair of normally opaque electro-optical shutters 12 and 22, inserted between mirrors 11, 21 and bodies 13, 23, transparent to the respective wavelengths $\lambda_1$ and $\lambda_2$. The intensity of the light flashes and the absorption effect of the dye cells 14, 24 are so chosen that the two beams $B_1$ and $B_2$ have the same coherence length and pulse width.

Figure 2:
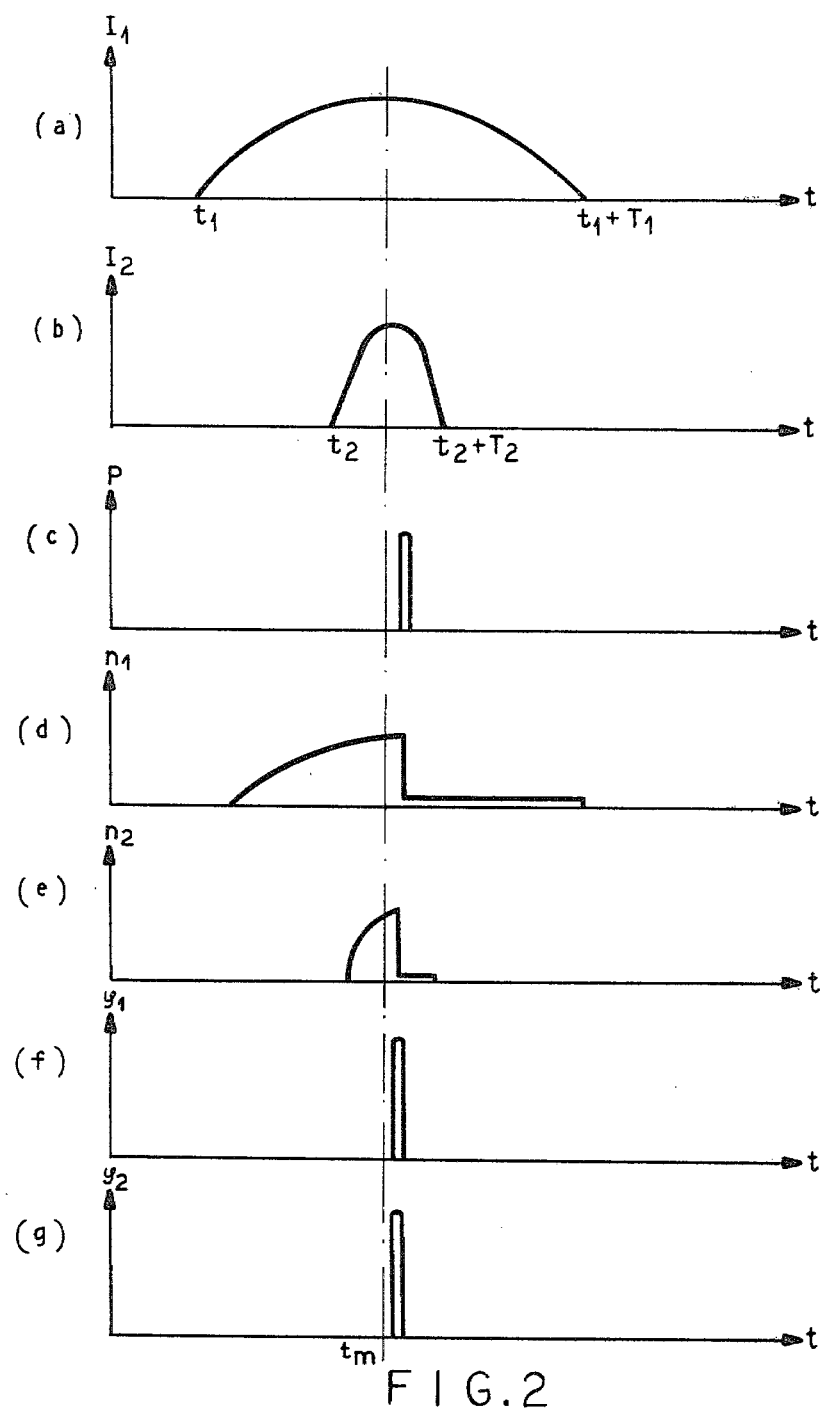
FIG. 2 is a set of graphs relating to the mode of operation of the system of FIG. 1.

Graphs (a) and (b) of FIG. 2 show the intensity $I_1$ and $I_2$ of the pumping radiation respectively emitted by lamps 17 and 27. Lamp 17 is energized by a current pulse starting at a time $t_1$ and lasting for a period $T_1$, e.g. of 1 millisecond. A similar current pulse starts at a later time $t_2$ and energizes the lamp 27 for a period $T_2$ which is substantially less than $T_1$. At an instant $t_m$, close to the peaks of the two current pulses shown in GRAPHS (a) and (b), the normally cut-off shutters 12 and 22 are momentarily turned on by a trigger pulse P as illustrated in graph (c) of FIG. 2. The curves of graphs (d) and (e) show the population inversions $n_1$ and $n_2$ occurring in the two active media 13 and 23, these curves rising from near-zero slightly after the starting points $t_1$ and $t_2$ of the respective light flashes and dropping sharply after peaking at time $t_m$ coinciding with the start of trigger pulse P. Similar pulses $\phi_1$ and $\phi_2$, shown in graphs (f) and (g), represent the density of coherent radiation generated in the cavities of lasers 10 and 20, respectively.

The resulting beams $B_1$ and $B_2$ are directed by a totally reflecting mirror 31 and by a semitransparent mirror 32 onto a common path so as to pass in collinear relationship through a nonlinear transmitting element 33, such as an $LiIO_3$ or KDP crystal, acting as an optical mixer. A third beam $B_3$ of coherent radiation, with a wavelength $\lambda_3$ of 420 nm obtained from the summing of the frequencies of beams $B_1$ and $B_2$ in crystal 33, passes together with a residual fraction $B_1'$ of beam $B_1$ through a selective reflector 34 sending the beam $B_2$ through a focusing objective 35 to a frequency doubler 36 which may be a crystal of the same composition as mixer 33. The lenses 35 are cylindrical with axes parallel to the plane of reflector 34. Frequency doubler 36 emits a fourth beam $B_4$ of coherent radiation, with a wavelength $\lambda_4$ of 532 nm, which is guided by reflectors 37, 38 and 39 into collinearity with beam $B_3$ traversing the semitransparent reflector 39. A residual beam $B_2'$ of wavelength 1064 nm passes through the selective reflector 37 and thus forms no part of a composite outgoing beam $B_0$ containing the wavelengths of 694 nm, 420 nm and 532 nm respectively contributed by beams $B_1'$, $B_3$ and $B_4$ which lie in the red, blue and green regions of the spectrum and which may be separated by conventional means not shown for utilization in the recording of full-color pulse holograms.

I claim:

1. A source of pulsed multicolor coherent light, comprising:

a first laser emitting a first coherent radiation in the red region of the visible spectrum;

a second laser emitting a second coherent radiation in the infrared part of the spectrum with a wavelength which is twice that of a color in the green region of the spectrum;

light-guiding means optically aligned with said lasers for forming said first and second radiations into collinear beams passing along a common path, said light-guiding means including nonlinear light-transmitting means in said common path for summing the frequencies of said first and second radiations to produce a third coherent radiation in the blue region of the spectrum, said light-guiding means further including frequency-doubling means in a further path for deriving from said second radiation a fourth coherent radiation in the green region of the spectrum; and a supply of pulsed energy for pumping said lasers in a correlated manner.

2. A light source as defined in claim 1 wherein each of said lasers includes an active medium inserted in a respective cavity between a totally reflecting mirror and a resonant reflector disposed at opposite ends of said cavity, said supply of pulsed energy comprising a flashing lamp positioned to illuminate each active medium.

3. A light source as defined in claim 2 wherein the active medium of said first laser is a ruby with an excitation wavelength of 694 nm, the active medium of said second laser being Nd: YAG with an excitation wavelength of 1064 nm.

4. A light source as defined in claim 2 or 3, further comprising a normally opaque electro-optical shutter in each cavity in line with the respective active medium thereof and timing means controlling said shutters in synchronism with said supply for concurrently rendering said shutters radiation-transmissive during a brief instant close to the occurrence of an intensity peak of light flashes emitted by said lamps.

5. A light source as defined in claim 4, further comprising a dye cell and an optical diaphragm disposed in each cavity in line with the respective active medium thereof.

6. A light source as defined in claim 1, 2 or 3 wherein said light-guiding means further includes part-transmissive reflectors downstream of said nonlinear light-transmitting means for deviating a fraction of the oncoming radiation from said common path onto a branch path thereafter rejoining said common path, said frequency-doubling means lying in said branch path.

7. A light source as defined in claim 6 wherein said light-guiding means further includes cylindrical means for focusing the radiation in said branch path.

* * * * *